June 13, 1972 W. H. HACKETT, JR., ET AL 3,669,767
DOPING PROFILE FOR GaP DIODES IMPROVED
ELECTROLUMINESCENT EFFICIENCY
Filed Aug. 21, 1969

INVENTORS W. H. HACKETT, JR.
D. L. SCHARFETTER
L. J. VARNERIN, JR.
BY George S. Indig
ATTORNEY United States Patent Office 3,669,767

Patented June 13, 1972

3,669,767
DOPING PROFILE FOR GaP DIODES IMPROVED ELECTROLUMINESCENT EFFICIENCY

William H. Hackett, Jr., and Donald L. Scharfetter, Morristown, and Lawrence J. Varnerin, Jr., Watchung, N.J., assignors to Bell Telephone Laboratories, Incorporated, Murray Hill and Berkeley Heights, N.J.

Filed Aug. 21, 1969, Ser. No. 851,987
Int. Cl. H01l 7/46; H05b 33/00
U.S. Cl. 148—171 2 Claims

ABSTRACT OF THE DISCLOSURE

The diffusion of relatively mobile acceptor dopant atoms away from the epitaxially-grown p-n junction of a gallium phosphide electroluminescent device during the epitaxial growth process causes the degradation of electroluminescent efficiency. This diffusion can be prevented by the inclusion of the mobile acceptor dopant as a minor dopant in the n-region in essentially the same concentration as is present as the major dopant in the p-region.

BACKGROUND OF THE INVENTION

(1) Field of the invention

This disclosure pertains to the doping of gallium phosphide electroluminescent devices.

(2) Description of the prior art

Electroluminescence is the production of light within a solid when a current is passed through the solid. If the solid is composed of a semiconducting material and contains a p-n junction, the luminescence occurs through radiative recombination of minority carrier (electrons and/or holes), which have been injected across the junction under forward bias, with majority carriers (holes and/or electrons).

Materials

Gallium phosphide (GaP) and Gallium Arsenide-Phosphide ($GaAs_xP_{1-x}$, with $x$ less than 0.6) have proven useful as electroluminescent materials in the visible region of the spectrum. They belong to the class of indirect band gap semiconductors, which means that the electron-hole recombination requires the presence of a third body such as a dislocation, a lattice defect, a substitutional or interstitial impurity or any other deviation from a perfectly ordered crystal. In the above-mentioned GaP-type materials the third body needed for recombination with the emission of red light is believed to be an impurity complex consisting of an oxygen ion and an acceptor ion (most commonly Zn or Cd) which are present substitutionally in the crystal lattice as a nearest neighbor pair on the p-side of the p-n junction. Under the influence of an applied forward bias voltage an electron is injected from the n-region into the p-region where it is trapped by the complex. Subsequently, a hole is also trapped at the same site, recombining with the electron and emitting a quantum of red light. If there are no complexes present in the region of injection, the electron will, in time, recombine by one of a number of other processes which do not involve the emission of light. Thus, an efficient GaP-type electroluminescent device requires both the efficient injection of electrons into the p-region and the presence, in the region of injection, of a sufficient concentration of oxygen-acceptor complexes.

GaP and $GaAs_xP_{1-x}$ are 3–5 compound semiconductors whose constituents belong to columns three and five of the Periodic Table of the elements. The donor (n-type) dopants are usually selected from column six and are included in the crystal lattice in a minus two ionic state, whereas the acceptor dopants are usually selected from column two and are included in the crystal lattice in the plus two ionic state. If these dopants are not uniformly distributed within the crystal they can move through the crystal lattice from regions of high concentration to regions of low concentration by the process of diffusion. It has been observed that in the GaAs and GaP systems the acceptor dopants are relatively mobile while the donor dopants are relatively immobile and tend to remain where they are deposited during crystal growth. The process of dopant diffusion through solids is strongly temperature dependent. It is usually unobservable in the vicinity of room temperature but, in some cases, it is important at temperatures met during crystal growth and annealing.

Growth techniques

A number of different techniques have been employed in the fabrication of GaP-type electroluminescent devices. The techniques pertinent to this disclosure involve the epitaxial deposition of material of one conductivity type upon a substrate of the other conductivity type. A junction, so produced is known as an epitaxially-grown junction. Substrates have been produced by the Czochralski technique (crystal pulling from a melt), solution growth (the slow cooling of a solution of the desired GaP material and suitable dopants in molten gallium), gas-phase epitaxy (the epitaxial deposition of the desired GaP material and suitable dopants from a carrier gas onto a GaAs substrate, which is subsequently ground off) and liquid-phase epitaxy (LPE) (to be described below).

In an exemplary form the LPE process as applied to GaP (Lorenz & Pilkuhn, Jour. Appl. Phys. 37, October 1966, page 4094) a suitable substrate is held at the upper end of a tube. In the lower end are placed carefully measured quantities of gallium, gallium phosphide and the desired dopants. The temperature of the tube is raised to between 1000° C. and 1200° C. where the gallium is molten and the other constituents dissolve in the molten gallium. The tube is then rotated so that the molten mass flows over the substrate and the temperature is lowered at a controlled rate. As the temperature of the molten gallium decreases, the dissolved material goes out of solution and is deposited on the substrate as an epitaxial crystal.

Electroluminescent junctions are formed by the epitaxial growth of material of one conductivity type on a substrate of the other conductivity type produced by one of the above methods. Most of the work on GaP electroluminescence, to date, has used the form of the LPE process described above which has been called "tipping."

The problem

The problem to which this teaching is addressed arises from the mobility of the acceptor dopants at junction growth temperatures. Since light emission takes place at "acceptor-oxygen complex" sites, the efficiency of the device depends critically on the concentration of such complexes in the immediate vicinity of the p-n junction, where the recombining electrons are injected into the p-type material. The diffusion of the acceptor dopant into the n-type material during junction growth decreases the concentration of acceptors at the junction and thus tends to decrease the concentration of acceptor-oxygen complexes. In addition this decrease of dopant concentration at the junction produces a concentration variation in the p-type material. This concentration variation produces an electric field in the p-type material in such a direction as to force the injected electrons back into the region of low complex concentration. These effects both tend to increase the relative probability of electron recombination by nonlight-emitting processes.

SUMMARY OF THE INVENTION

The invention disclosed here is the inclusion of the acceptor dopant as a minor dopant in the donor doped material used to produce the p-n junction. The presence of the acceptor dopant in the n-type material will reduce or prevent entirely changes in the acceptor doping level within the p-type material caused by diffusion, since the diffusion rate depends on the difference between the acceptor concentrations on the p and the n sides of the junction. The inclusion of an acceptor dopant on the n side of the junction will, of course, require an attendant increase in the donor doping in order to maintain the net carrier concentration in the n-type material.

This decreased diffusion of the acceptor dopant will tend to maintain the desired acceptor-oxygen complex concentration in the p-type material and thus increase the efficiency of the radiative recombination of the electrons injected into this p-type material. The increase in electroluminescent efficiency resulting from the application of this teaching will make such solid state light sources more attractive as indicator lamps and other display devices controlled by solid state circuitry.

DETAILED DESCRIPTION

Gallium Arsenide-Phosphide ($GaAs_xP_{1-x}$) mixed crystals are indirect band gap semiconductors in the concentration range from pure GaP to 40% GaP-60% GaAs ("Semiconductors and Semimetals," Willardson and Beer, vol. 1, page 8). Within this concentration range the recombination of electrons from the lowest energy conduction band states and holes from the lowest energy valence band states requires the presence of a third "particle." In forward biased devices, red light is emitted from p-type material doped additionally with oxygen. In this case the required third "particle" is believed to be an impurity complex, composed of an acceptor ion and an oxygen ion which are presented in the lattice substitutionally as nearest neighbors.

In GaP-type crystals the Group 6 elements (of the Periodic Table) O, S, Se and Te are donor dopants. Of these, S, Se and Te provide the shallow donor states required for semiconductor devices at room temperature. Acceptor dopants for these materials come from Group 2 of the Periodic Table. Devices have been fabricated using Zn, Cd, Be, and Mg as acceptor dopants. Of these, the most commonly used are Zn and Cd. (Ba, Ca, Hg and Sr should also function as acceptor dopants.)

The present invention relates to the relationship between the characteristic lengths involved in two different kinds of diffusion processes: (1) The diffusion of dopant atoms or ions from regions of high to regions of low concentration and (2) the diffusion of mobile minority charge-carriers (i.e., electrons or holes) through a region of the other conductivity type before recombination. Diffusion lengths of electrons through p-type GaP-family materials are typically 0.5 to 2 microns at room temperature. (The diffusion length of the electrons is related to the average distance of travel perpendicular to the p-n junction between the point of injection and the point of recombination.) At room temperature the diffusion lengths of dopant atoms are orders of magnitude smaller than this and, thus, such diffusion is unimportant. At the temperatures and times met during LPE (of the order of 1100° C. and a half hour) the diffusion lengths of donor dopants are still small compared to typical electron diffusion lengths. However, acceptor diffusion lengths are typically of the order of 0.5 to 2.0 microns (S. F. Nygren, Technical Report #5112–3 Stanford Electronics Lab. (October 1968) 58), quite comparable to electron diffusion lengths, so that acceptor diffusion can cause concentration changes leading to important electrical effects. In particular, the diffusion of the acceptor dopant across the boundary between the substrate and the epitaxially grown material can lead to devices of reduced electroluminescent efficiency.

Figure 1:
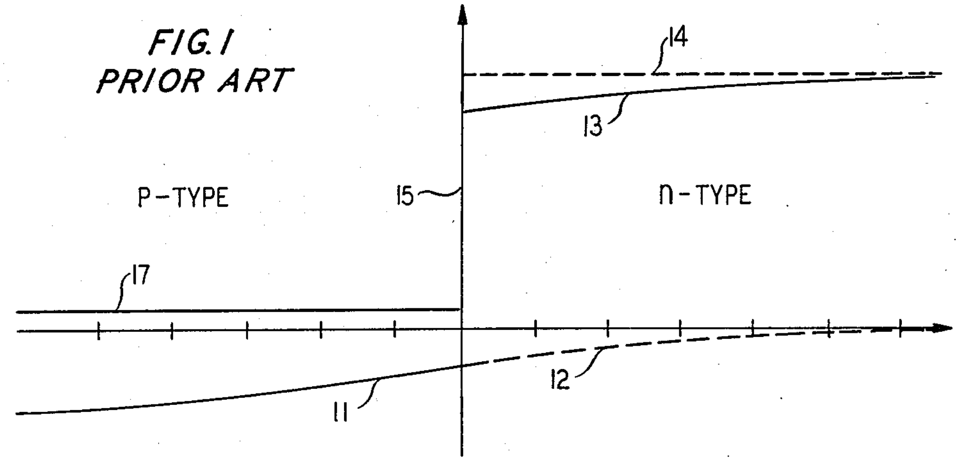
FIG. 1 PRIOR ART
FIG. 1 (prior art) is a curve depicting the concentration of various dopants (vertical axis) as a function of position (horizontal axis) in the neighborhood of the p-n junction of an electroluminescent device composed primarily of a GaP-type material.

The reason for such reduced efficiency is indicated in FIG. 1. In this figure, as in FIGS. 2 and 3 p-type material is to the left and n-type material is to the right. Donor concentrations are shown above the horizontal axis and acceptor concentrations are shown below the horizontal axis. FIG. 1 shows that acceptor material, initially included only to the left of the interface 15 between the substrate and the epitaxially grown material, has diffused 12 to the right of the interface 15 over a distance of the order of a micron. This diffusion leaves the acceptor concentration depleted in the immediate vicinity to the left of the interface 15; thus it is believed that the "acceptor-oxygen complex" concentration is also depleted in the immediate vicinity to the left of the interface 15. While traversing this region of decreased "complex" concentration, electrons suffer a larger proportions of non-light-producing recombinations than they would have, had the "complex" concentration been maintained. Also the slope of the concentration 11 produces an electric field in the p-region tending to force the injected electrons back into the region of low concentration. The oxygen doping level is shown as 17, the donor doping level is shown as 14 and the net donor concentration is shown as 13.

Figure 2:
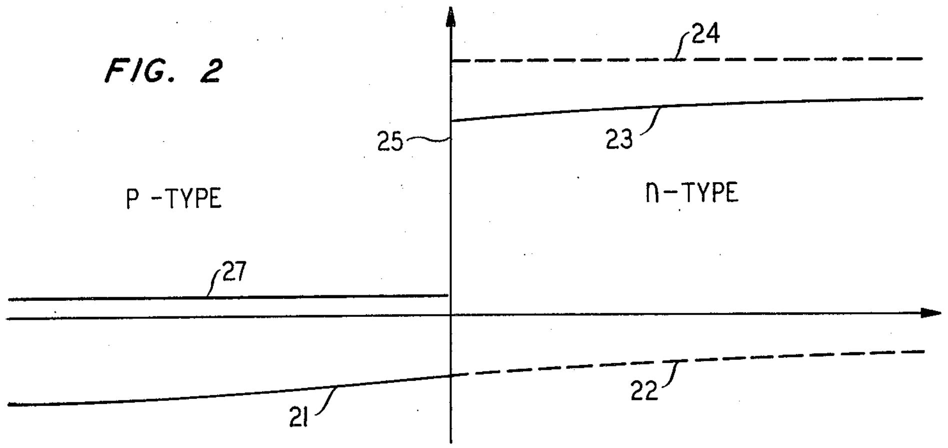
FIG. 2 is a concentration versus position curve (as FIG. 1) with the addition of the p-type dopant to the material used to produce the n side of the junction.
Figure 3:
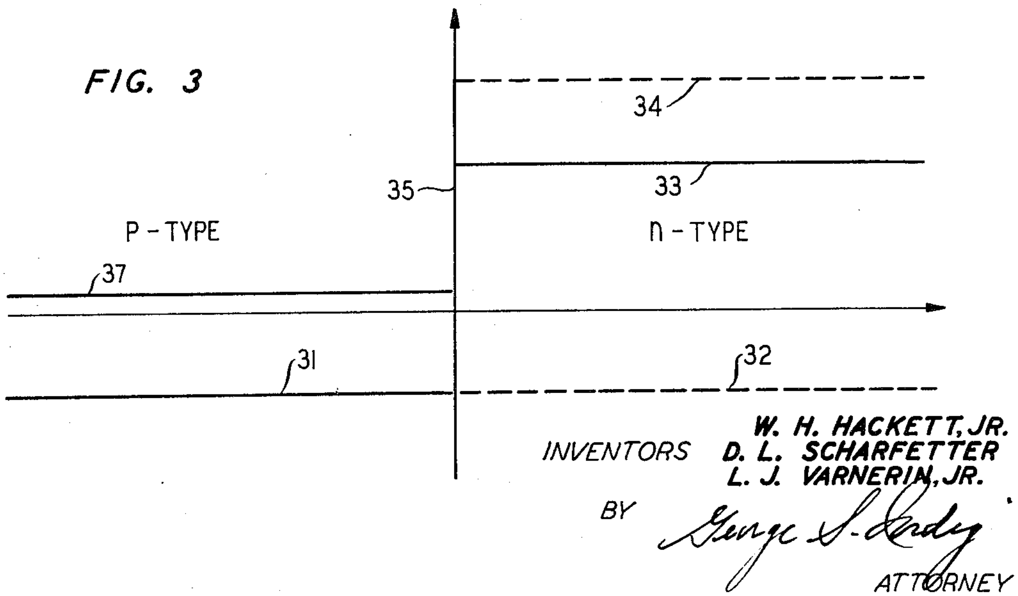
FIG. 3 is a concentration versus position curve (as FIG. 2) in which the concentration of the p-type dopant is the same on both sides of the p-n junction.

In FIG. 2, 21 shows the lessening of the acceptor depletion and the decrease of the concentration slope in the p-region due to increased concentration 22 of acceptors to the right of the interface 25. The partial compensation of the donor dopant 24 by the acceptor dopant 22 is shown by the net donor concentration 23. The idealized case of the application of this teaching is shown in FIG. 3 where equal acceptor doping 31, 32 on either side of the interface 35 completely prevents acceptor concentration change 31 to the left of the interface 35. While this is the idealized case, it may not lead to the optimum device because of the many practical considerations, such as carrier mobility, viewed by knowledgeable practitioners. In fact, acceptor doping levels on the n side of the interface 25 greatly exceeding those on the p side may, under certain circumstances, lead to increased efficiency due to the increase of acceptor concentration on the p side in the immediate vicinity of the interface 25 due to diffusion from the n side. Such doping is also considered to be taught by this disclosure. In devices of this sort the donor doping level 24 must be increased in order to maintain a net donor concentration 23 to the right of the interface 25.

Measurements made on prior art devices of the type shown in FIG. 1 (Logan et al. Appl. Phys. Lett. 10 (1967) 206) in which Te doped GaP is deposited by LPE onto a Zn and $Ga_2O_3$ doped solution grown substrate (i.e. epitaxial growth proceeds from the interface 15 to the right) show the effects of Zn diffusion into the Te doped region, in view of the fact that the inherent efficiency of the p-type solution-grown substrate has been shown to be much greater (Gershergon et al. Jour. Appl. Phys. 36 (1965) 1528). The application of the teaching of this disclosure to such a device by the inclusion of Zn in the Te doped melt should lead to improved efficiency. The present teaching is equivalently useful if epitaxial growth proceeds from the interface 15 to the left. In addition, any dopant concentration variations which might be present in this device far from the interface (at distances large compared with the electron diffusion length such as 10 microns) do not affect the utility of the teaching. Improved device performance is realized by additions, however small, of the acceptor dopant to the material used to produce the n side of the p-n junction. However, such additions leading to an acceptor concentration less than 5% of the acceptor concentration in the p material will lead to minimal improvements. If the dopants used to produce this n side of the p-n junction is the gallium solution, the acceptor concentration in the solution producing the above-mentioned 5% in the device may be more or less than 5% depending on the relative segregation coefficients of the various solute materials during epitaxial deposition. The concept of segregation is well known to persons skilled in the art and the calculations necessary to produce the final desired concentration rest on a firm experimental foundation (Trumbore et al. J. Electrochem Sec. 112 (1965) 782).

A preferred embodiment of the teaching would include acceptor dopants leading to an acceptor concentration in the n-type material at least 50% as great and up to 50% greater than the acceptor concentration in the p-type material.

We claim:

1. A process for the production of a GaP type electroluminescent device composed primarily of an indirect band gap semiconductor material containing at least 40% GaP the remainder consisting primarily of GaAs comprising (1) maintaining, at a first temperature, a doped GaP type semiconductor substrate and a liquid mass comprising a solute, the said semiconductor material and dopant material;

(2) contacting the said substrate and the said liquid mass; and (3) reducing the temperature of the said substrate and the said liquid mass to a second temperature producing an epitaxially grown p-n junction characterized in that the same p-type dopant, which is the major dopant on the p side of the said p-n junction, is included as a minor dopant in the material used to produce the n side of the said p-n junction in a concentration such that the concentration of the said same p-type dopant on the n side of the said p-n junction is at least 5% as great as the concentration of the said same p-type dopant on the p side of the said p-n junction for a distance of at least $10^{-5}$ meters (10 microns) away from the said p-n junction, and the said same p-type dopant is a member of the group consisting of Be, Mg, Zn, Cd, Hg, Ca and Sr and the said p side of the said p-n junction contains O in sufficient quantity to contribute to significant electroluminescence.

2. A process of claim 1 in which the said same p-type dopant is Zn and in which the dopants on the said n side of the said p-n junction comprise Zn and a member of the group S, Se, and Te and in which the dopants on the said p side of the said p-n junction comprise Zn and O.

References Cited

UNITED STATES PATENTS

| | | | |
|---|---|---|---|
| 3,365,630 | 1/1968 | Logan et al. | 317—237 |
| 3,278,342 | 10/1966 | John et al. | 148—1.6 |
| 3,404,305 | 10/1968 | Wright | 313—108 |
| 3,523,045 | 8/1970 | Suzuki et al. | 317—234 X |
| 3,351,828 | 11/1967 | Beale et al. | 317—235 |
| 3,363,155 | 11/1968 | Newman | 317—235 |

OTHER REFERENCES

Pilkuhn et al., "Electroluminescence and Lasing Action in $GaAs_xP_{1-x}$," J. Applied Physics, vol. 36, No. 3, March 1965, pp. 684–688.

Lorenz et al., "Preparation and Properties of Solution-Grown Epitaxial P-N Junctions in GaP," J. Applied Physics, vol. 37, No. 11, October 1966, pp. 4094–4102.

Logan et al., "P-N Junctions in GaP With External Electroluminescence Efficiency $\approx$2% at 25° C.," Applied Physics Letters, vol. 10, No. 7, April 1967, pp. 206–208.

Kressel et al., "Effect of the Donor Concentration . . . GaP Diodes," Solid State Electronics, vol. 11, 1968, pp. 647–652.

L. DEWAYNE RUTLEDGE, Primary Examiner

W. G. SABA, Assistant Examiner

U.S. Cl. X.R.

148—1.5, 172, 173; 252—62.3 GA; 313—108; 317—235 N